2,908,551

PROCESS FOR THE PREPARATION OF CYANOGEN

Hugh M. Hulburt, Hastings on Hudson, N.Y., and Daniel Hyman, Springdale, Conn., assignors to American Cyanamid Company, New York, N.Y., a corporation of Maine No Drawing. Application March 18, 1957
Serial No. 646,575

6 Claims. (Cl. 23—151)

This invention relates to a method for preparing cyanogen and, more particularly, to the process for forming cyanogen by a flame synthesis in the absence or presence of an inert medium. Still more specifically, it is concerned with the instantaneous flame reaction of gaseous hydrogen cyanide, chlorine and hydrogen to form cyanogen in good yield.

In the past, several processes have been suggested for preparing cyanogen. One such practice involves the reaction of anhydrous hydrogen cyanide and chlorine over a catalyst at elevated temperatures up to about 1000° C. Although the process is operable, a serious drawback is present due to the relatively slow reaction rate, even at these elevated temperatures. Consequently, a very large reaction space is needed to obtain commercially acceptable yields of cyanogen. Such large reaction volumes lead to problems of heat transfer, proper mixing of the gas reactants within the reaction vessel, and preclude use of higher temperatures which otherwise seem desirable.

Another procedure involves the reaction of cyanogen chloride and hydrogen under elevated temperatures up to 1000° C. Reaction times of more than 0.5 second are required. The principal shortcoming of this process is the requirement for preforming cyanogen chloride by reacting hydrogen cyanide and chlorine prior to reaction. This requires a necessary but wholly undesirable additional operational step.

It is a prime object of the present invention to overcome the disadvantages of the prior practices by devising a straight-forward procedure for directly reacting hydrogen cyanide and chlorine. It is a further object to devise a method for almost instantaneously effecting reaction of hydrogen cyanide and chlorine.

Such a process has many advantages. It would avoid the use of expensive equipment. For example, to withstand the corrosive effect of chlorine, stainless steel or other chlorine-resistant fabricating material was required for the reactor. However, in normal usage such reactor, by its physical nature, may be safely heated to temperatures not in excess of about 550° C., for otherwise chlorine becomes excessively corrosive. At such temperatures, reaction between chlorine and hydrogen cyanide is relatively slow and, therefore, is not wholly satisfactory. To elevate the temperature, say above 550° C., the reactor is soon rendered worthless.

To avoid this result, quartz which is resistant to chlorine corrosion was used as a fabricating material. However, at elevated temperatures in excess of about 1000° C., spalling occurred due to temperature fluctuations and therefore was found unsuitable. Although quartz tubes and other suitably thermally insulated reactors have been previously suggested, the prior art has effected reaction within a relatively large volume or space, rather than in a concentrated or pin-pointed area independent of the proximity of wall enclosures, as proposed by the present invention.

Surprisingly, it has been found according to the process of this invention that hydrogen cyanide and chlorine not only can be reacted almost instantaneously but without employing special equipment. This reaction can be effected in a flame by igniting and burning hydrogen cyanide and chlorine in the presence of hydrogen at a temperature of about 1200° C. or higher. Unexpectedly, reaction occurs instantaneously, seemingly within less than about one-thousandth of a second.

According to the process of the invention, the reactants are fed to a suitable burner where they are ignited. Advantageously, the reactants are preheated prior to reaction. For instance, hydrogen cyanide, chlorine and hydrogen may be preheated to temperatures of at least about 200° C. or higher and fed to a conventional-type burner where they are ignited at temperatures of about 1200° C. and above. The burner may be enclosed in any suitable space. Resultant gaseous products can be removed from the space so as to be further processed to recover cyanogen in good yield and purity. The latter recovery operation is conventional and forms no part of this invention. Cyanogen may be recovered in a variety of ways. For example, the gaseous products withdrawn from the enclosed space are passed through a water scrubber at room temperature to remove acidic and other impurities. Cyanogen is recovered by collecting the gas issuing from the scrubber.

In general, while the reacting gases may be ignited and burned directly, preheating of the gases prior to reaction has been found to be advantageous. However, preheating to temperatures from about 200° C. to about 600° C. is a good practice. Preheating may be accomplished conventionally as between incoming gases and outgoing reacted gases. Another alternative method for preheating the gaseous mixture is to electrically heat the incoming gases to the desired temperature before introducing the latter gases to the burner.

The burner may be any conventional type, such as a silica or brick-lined steel burner. It may be housed in any suitable enclosed space provided with a suitable exit port. Ignition of the gases at the burner can be achieved by a variety of suitable means such as a retractable torch using oxygen and hydrogen, an electric spark or a heated platinum wire.

According to the stoichiometry of the hydrogen cyanide-chlorine reaction, two mols of hydrogen cyanide will react with one mol of chlorine to produce cyanogen. However, it has been surprisingly found that a lesser mol quantity of hydrogen cyanide can be used. For instance, as little as one and one-half mols of hydrogen cyanide per mol of chlorine can be reacted with good effect.

To supply heat and sustain the flame of reaction, the presence of hydrogen has presently been found to be a prerequisite. However, the mol ratio of hydrogen may be widely varied, namely, from about one-quarter (0.25) to two (2) mols of hydrogen per mol of chlorine.

It is an advantage of the present invention that hydrogen cyanide, chlorine and hydrogen may be separately fed to the burner and ignited. Alternatively, they may be variously premixed, such as by mixing hydrogen cyanide and chlorine prior to reaction. Advantageously, as noted above, these gases should be preheated to at least 200° C. In addition, the reaction may occur in the presence or absence of an inert gas, such as nitrogen or helium.

The flame temperature, usually within the range of from about 1200° C. to about 1800° C., can be employed. The selection of such temperature depends upon the volume of hydrogen gas introduced. For instance, the higher the mol ratio of hydrogen to chlorine, the lower the temperature. In this practice, the reaction at flame temperature is substantially completed within about 0.001 to about 0.00001 second or less.

The invention will be further illustrated in the following examples.

EXAMPLES

Several runs were made by continuously passing preheated gaseous hydrogen cyanide, chlorine, and hydrogen to a silica burner and ignited by means of a heated platinum wire. Resultant gases are exited and cooled to room temperature in each run of the examples. Cyanogen is recovered by removing undesirable by-product in a water scrubber. It is then collected as the issuing gas from the scrubber. The latter gas is identified by infra-red analysis as cyanogen.

The conditions of reaction and results obtained are recorded in the table below:

Table

| Run | Gas Rate, Ml./Min. | | | | Preheat Temp., °C. | Flame Temp., °C. | Reaction Time, Sec. | Yield [1] (Percent) |
|---|---|---|---|---|---|---|---|---|
|  | $H_2$ | HCN | $Cl_2$ | $N_2$ |  |  |  |  |
| 1 | 850 | 1,040 | 750 | 0 | About 400° C | About 1,200° C | $1 \times 10^{-3}$ | 19.7 |
| 2 | 120 | 1,040 | 510 | 130 | About 400° C | About 1,500° C | $1 \times 10^{-4}$ | 26.8 |
| 3 | 210 | 1,040 | 510 | 130 | About 400° C | About 1,500° C | $1 \times 10^{-4}$ | 28.6 |
| 4 | 185 | 1,040 | 750 | 0 | About 500° C | About 1,800° C | $1 \times 10^{-5}$ | 36.8 |

[1] Percent conversion to $(CN)_2$ based on HCN fed.

It is an advantage of the process of the invention that the time of reaction is markedly decreased over the previous practices. Hence, efficiency of process and overall yield of product are increased while permitting the operation to remain independent of reaction volume considerations. Thus, the cost for equipment which is required for effecting reaction is relatively inexpensive. The process as described and claimed lends itself to good commercial exploitation.

What is claimed is:

1. The method of preparing cyanogen which comprises establishing a flame by igniting and burning hydrogen cyanide and chlorine in the presence of hydrogen at a temperature of at least about 1200° C., forming cyanogen substantially instantaneously, removing the resulting gaseous effluent containing cyanogen from said flame substantially as formed, and recovering cyanogen from said effluent.

2. The method of preparing cyanogen which comprises: preheating a gaseous mixture of chlorine, hydrogen cyanide and hydrogen in the mol ratio of 1:1.5–2.0:0.25–2, respectively, establishing a flame by igniting and burning said preheated gaseous mixture at a temperature of at least 1200° C., forming cyanogen within not more than about 0.001 second, removing the resulting gaseous effluent containing cyanogen from said flame substantially as formed, and recovering cyanogen from said effluent.

3. The method according to claim 2 in which the gases are ignited in an atmosphere of nitrogen.

4. The method according to claim 2 in which the gases are preheated at temperatures within the range between about 200° C. and about 600° C.

5. The method according to claim 2 in which the temperature of reaction is within the range of from about 1200° C. to about 1800° C.

6. The method according to claim 2 in which the reaction contact time is between $1 \times 10^{-3}$ and $1 \times 10^{-5}$ second.

References Cited in the file of this patent

UNITED STATES PATENTS

| 2,399,361 | Lacy et al. | Apr. 30, 1946 |
| 2,730,430 | Dixon | Jan. 10, 1956 |